Figure 1:
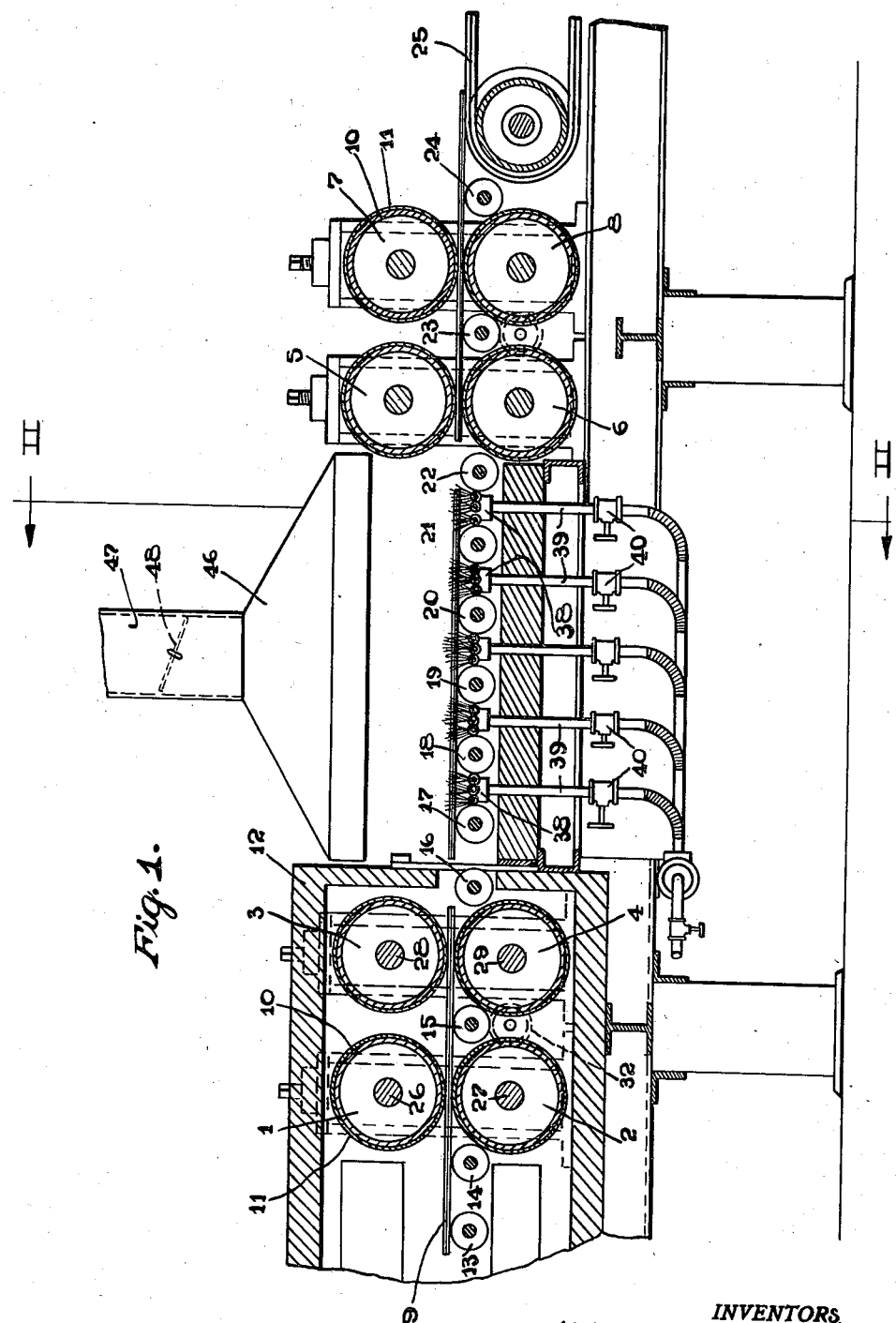

Feb. 18, 1936. J. W. KAMERER ET AL 2,030,878
SAFETY GLASS
Filed Oct. 21, 1933 3 Sheets-Sheet 2

INVENTORS.
J.W. KAMERER and
BY L.S. WHITMIRE.
ATTORNEYS.

Feb. 18, 1936.  J. W. KAMERER ET AL  2,030,878
SAFETY GLASS
Filed Oct. 21, 1933   3 Sheets-Sheet 3
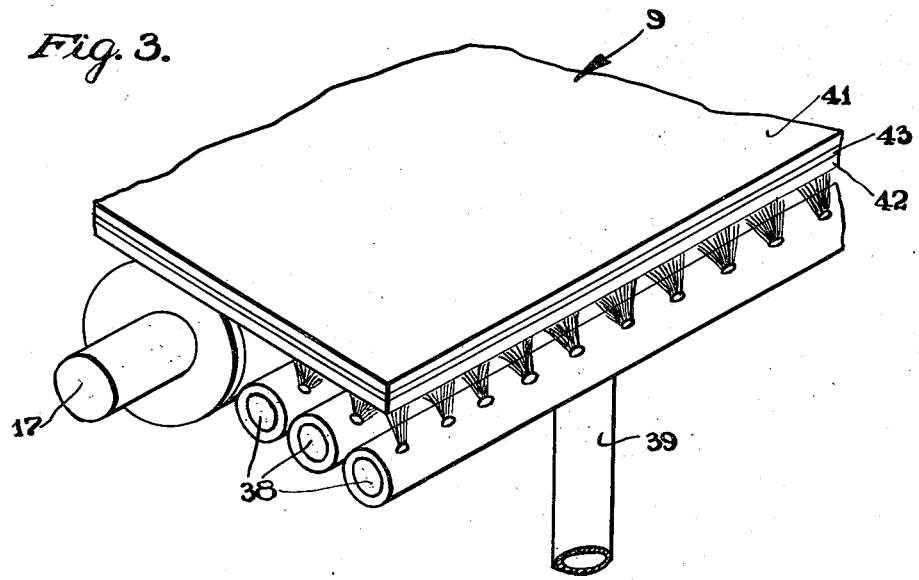
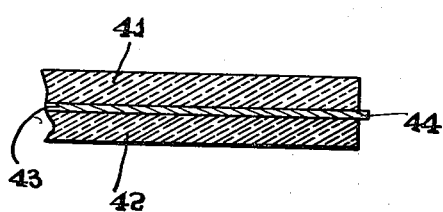
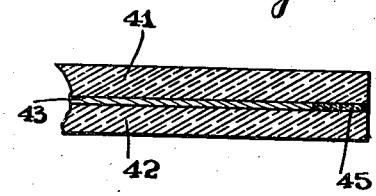
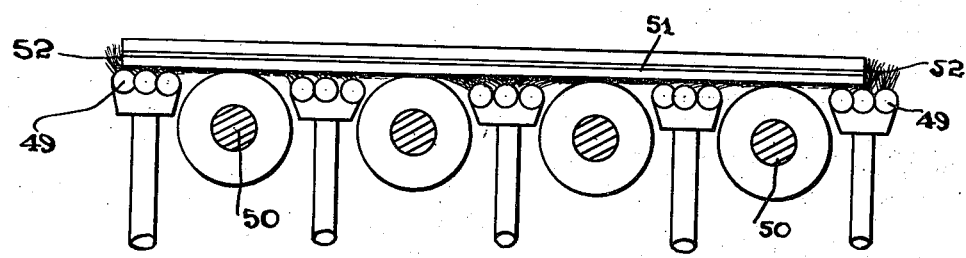
INVENTORS.
J. W. KAMERER and
BY L. S. WHITMIRE.
Bradley & Price
ATTORNEYS.

Patented Feb. 18, 1936

2,030,878

UNITED STATES PATENT OFFICE 2,030,878

SAFETY GLASS

James W. Kamerer, New Kensington, and Le Roy S. Whitmire, Natrona Heights, Pa., assignors to Duplate Corporation, a corporation of Delaware Application October 21, 1933, Serial No. 694,580

3 Claims. (Cl. 49—81)

The invention relates to a process and apparatus for making safety glass which ordinarily consists of two sheets of glass cemented or otherwise secured to the opposite sides of a sheet of reinforcing material, such as cellulose plastic (cllulose nitrate, cellulose acetate, ethyl cellulose, etc.), or one of the synthetic resins, such as glyptol, polyvinyl acetates or chloracetates, phenol formaldehyde condensation products, toluene sulfonamide derivatives, etc. The method now largely pursued in forming the laminations is to prepare the sheets for adhesion, pass them between rolls to adhere them together lightly then press them in a platen or other press to seal the joints at the edges of the sandwich, and finally subject them to heavy pressure in heated liquid which contacts directly with the glass sheets. One of the objects of the present invention is to provide a process and apparatus in connection with the roll pressing which will seal the joints at the edges of the sheets, and thus obviate the necessity of the step which involves pressing the laminated sheets in the platen or other press preliminary to the final hydraulic pressing. A further object is to provide means during the roller pressing step for removing the fin of reinforcing material which projects out past the edges of the glass sheets, and is due to the fact that reinforcing sheet must always be cut somewhat over-size as compared with the glass sheets in order to insure that such reinforcing sheet will be at least coextensive with the glass sheets. The removal of such fin is an item of labor and expense which the use of the present process and apparatus avoids.

Briefly stated the foregoing results are achieved in the preferred process and apparatus by the use of gas burners which play upon the composited plates in the course of their travel through the roller press. When the reinforcing sheet is of pyroxylin plastic or other combustible material the heat thus applied burns off the projecting fin. It further so heats the plastic material at the edges of the composite plate that it softens and swells and when the plate passes the next pair of pressing rolls the pressure applied by these rolls acting on the heated plate edges causes them to seal securely. As a result the plates emerge from the roller press completely prepared for the final hydraulic pressing so that the step heretofore necessary of pressing the plates in a platen or other press is dispensed with, materially cheapening the cost of production.

Figure 2:
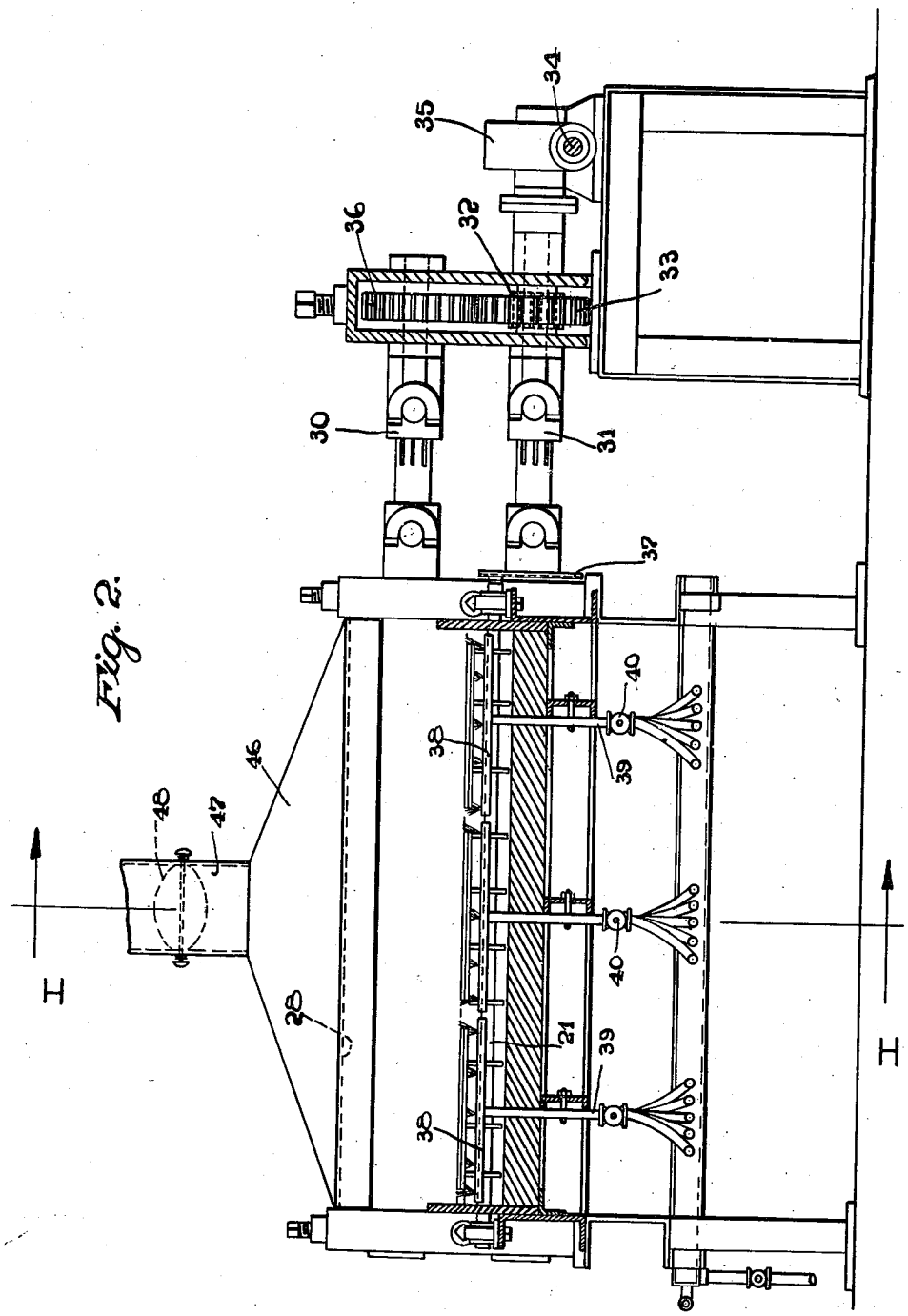

Certain embodiments of the apparatus for practicing the process are shown in the accompanying drawings, wherein:

Figure 1 is a vertical longitudinal section through the apparatus on the line I—I of Fig. 2. Fig. 2 is a transverse section on the line II—II of Fig. 1. Fig. 3 is a perspective view on an enlarged scale. Figs. 4 and 5 are sections through the edge of a composite plate showing the steps of the process. And Fig. 6 is a detail section illustrating a modification.

Referring to the drawings, 1—2, 3—4, 5—6, and 7—8 are pairs of opposing presser rolls of a roller press mounted in suitable bearings and adapted to apply pressure to a series of composite plates 9 which pass through the press. Only four pairs of rolls are shown for simplicity of illustration, but it will be understood that a relatively large number of pairs of rolls may be employed depending upon requirements. The rolls each comprises a tubular metal portion 10 provided with a covering 11 of material having some give, rubber of varying degrees of hardness being suitable for the purpose. The pairs of rolls 1—2, and 3—4 are preferably mounted in a casing 12 which is suitably heated in order to soften the adhesive used in connection with the sheets. The assembled sheets are supplied to the rolls and carried therethrough by means of the small rollers 13 to 24. After the sheets have emerged from the press, they are carried away on a suitable belt conveyor 25.

Any suitable means may be employed for driving the sets of presser rolls, such drive means being preferably of the type which permits vertical adjustment of the rolls, such as that shown in Fig. 2, wherein the ends of the shafts 26, 27, 28, 29 are driven by the tumbler shafts 30 and 31 having universal joint connections with the roll shafts. The lower tumbler shafts 31 which engage the roll shafts 27 and 29 are driven from a pinion 32, which engages a pair of spur gears 33, carried by the outer ends of the shafts 31. The pinion 32 is driven from the line shaft 34 through the intermediary of suitable reduction gearing in the casing 35. The upper tumbler shafts 30 which are coupled to the ends of the shafts 26 and 28 are driven by means of a pair of spur gears 36 which mesh with the gears 33. A similar drive is provided for the pairs of rolls 5—6 and 7—8. The rollers 13 to 24 are provided with sprockets over which passes a sprocket chain 37, and such sprocket chain is driven by a sprocket carried on the shaft 29.

Interspersed between the rolls 17 to 23 are the gas burners 38 supplied from the vertical pipes 39 having the control valves 40. The burners 38 are of such length that they project out past the edges of the laminated sheets passing over the roller runway. In using the apparatus, the sheets to be composited are arranged in the relation indicated in Fig. 4, in which 41 and 42 are the glass sheets and 43 is a sheet of reinforcing material, such as cellulose nitrate with a suitable cement on the surfaces of the glass sheets, such assembled sheets being placed on the runway at the left of the first rolls 1 and 2 of the set. After passing the rolls 1—2 and 3—4, the sheets are lightly stuck together due to the pressure of the rolls and pass onto the set of rolls 17 to 22. In passing over this set of rolls, the flames from the gas burners 38 act upon the sheet and burn off the fin 44 which projects out past the edges of the glass sheets, as indicated in Fig. 4, thus bringing the composite plate to the form indicated in Fig. 5 with the cellulose nitrate flush with the edges of the glass sheets. At this time, the cellulose nitrate, as indicated at 45 in Fig. 5, is relatively hot and soft, and due to this condition, expands sufficiently to make complete contact with the glass lying above and below the heated body of material. The composited plates now pass between the sets of rolls 5—6 and 7—8 and are given a further pressing action which is effective to insure a seal around the edges of each sheet due to the hot plastic condition of the reinforcing sheet at its edges. Due to this condition, a perfect seal is secured around the edges of the composite plate, so that the plates do not require any further pressing in a platen or similar press preliminary to the final hydraulic pressure. The plates are, therefore, removed directly from the conveyor 25 and transferred to the hydraulic tank or press in which they are exposed to heavy pressure of the pressing liquid in direct contact therewith, the liquid being heated in the usual way. The pressure applied in the final hydraulic pressing is approximately 150 lbs. per square inch, and the temperature of the liquid about 240 deg. F., this pressure and temperature corresponding to that commonly used in hydraulic pressing of laminated glass. In order to carry away the fumes of the plastic which is burned, a hood 46 is preferably provided over the runway consisting of the rollers 17 to 22, such hood having an outlet chimney 47 provided with a suitable damper 48.

While the process as above described is of special value in those cases in which the reinforcing consists of cellulose nitrate plastic, which is combustible, it may also be used to advantage with plastics or reinforcing materials which are not combustible, such as cellulose acetate, as the projecting fin 44 will in some cases be melted away even though it had not burned, and in all cases where the reinforcing material softens under the application of heat, the process has advantage in that an edge sealing function is secured due to the passage of the composite plates through the rolls 5—6 and 7—8, after the reinforcing material has been heated and caused to swell due to its passage over the burners. The invention is, therefore, not limited in its application or utility to use with composite plates employing cellulose nitrate plastic as its reinforcing material.

Fig. 6 illustrates a modification in which the burners 49 which are interspersed between the rolls 50 are placed relatively close to the lower sheet of glass constituting the composite plate 51, so that the gases of combustion emerging from the burners do not ignite and burn until they pass out laterally to the edges of the sheets where they burn, as indicated at 52. This gives all the combustion of the gases at the edges of the glass sheets where the heat is most needed, and this arrangement is particularly serviceable when the reinforcing material is of such character that it requires a very high temperature to burn it or melt it away. It will be understood that a large number of different burner arrangements may be employed, the arrangement illustrated being merely one of a number which has given very satisfactory results in service. With most reinforcing materials commercially available, the process acts to remove the projecting fin 44 and to give a complete seal at the edges of the sheets, so that no further pressing operation is required before transferring the plates to the pressing tank for the final pressing operation.

What we claim is:

1. A process of making safety glass which consists in adhering two sheets of glass to the opposite sides of a sheet of reinforcing material which is combustible, which softens on the application of heat, and which projects out past the edges of the glass sheets, exposing the edges of the plate thus formed to a flame which burns off the projecting portions of the reinforcing sheet and softens the edges of such sheet lying inward of the burned portions, subjecting the plate while said edges are still plastic to pressure, and then placing the plate in a bath of fluid having direct contact with the surfaces thereof and applying pressure to the bath.

2. A process of preparing safety glass for final pressing hydraulically, which consists in roller pressing two sheets of glass with an interposed sheet of reinforcing material which softens on the application of heat, and as an intermediate step in the course of such pressing, applying a flame to the edges of the plates so as to soften the edges of the reinforcing sheet.

3. A process of preparing safety glass for final pressing hydraulically, which consists in roller pressing two sheets of glass with an interposed sheet of combustible reinforcing material, which softens on the application of heat and whose edges project out past the edges of the glass sheets, and as an intermediate step, in the course of such pressing, applying a gas flame across the width of the plates so as to burn off the projecting edges of the reinforcing sheets and soften the edges of the sheet lying inward from such burned off portion.

JAMES W. KAMERER.
LE ROY S. WHITMIRE.